us009903668B2

United States Patent
Hedberg et al.

(10) Patent No.: US 9,903,668 B2
(45) Date of Patent: *Feb. 27, 2018

(54) GASKET AND ASSEMBLY

(71) Applicant: ALFA LAVAL CORPORATE AB, Lund (SE)

(72) Inventors: Magnus Hedberg, Malmo (SE); Johan Nilsson, Ronneby (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/429,646

(22) PCT Filed: May 27, 2013

(86) PCT No.: PCT/EP2013/060875
§ 371 (c)(1),
(2) Date: Mar. 19, 2015

(87) PCT Pub. No.: WO2014/067674
PCT Pub. Date: May 8, 2014

(65) Prior Publication Data
US 2015/0253087 A1 Sep. 10, 2015

(30) Foreign Application Priority Data

Oct. 30, 2012 (EP) .................................... 12190493
Oct. 30, 2012 (EP) .................................... 12190496
Jan. 30, 2013 (EP) .................................... 13153167

(51) Int. Cl.
F16J 15/06 (2006.01)
F16J 15/02 (2006.01)
(Continued)

(52) U.S. Cl.
CPC ............... *F28F 3/10* (2013.01); *F16J 15/022* (2013.01); *F16J 15/06* (2013.01); *F16J 15/104* (2013.01);
(Continued)

(58) Field of Classification Search
CPC .......... F16J 15/022; F16J 15/06; F16J 15/062; F16J 15/104; F28F 9/005; F28F 9/0248; F28F 2230/00; F28D 9/0043; F28D 9/005
See application file for complete search history.

(56) References Cited

U.S. PATENT DOCUMENTS 3,258,832 A * 7/1966 Gerstung ............... B21D 53/04
165/148
3,862,661 A * 1/1975 Kovalenko ............. F28F 3/083
165/166
(Continued)

FOREIGN PATENT DOCUMENTS

CN 101484771 A 7/2009
CN 202304548 U 7/2012
(Continued)

OTHER PUBLICATIONS

English language translation of Search Report dated May 5, 2015, by the State Intellectual Property Office of China in corresponding Chinese Application No. 201310264742.0. (2 pages).
(Continued)

*Primary Examiner* — Nicholas L Foster
(74) *Attorney, Agent, or Firm* — Buchanan Ingersoll & Rooney PC

(57) ABSTRACT

A gasket comprises an annular gasket portion arranged to enclose a port hole of a heat exchanger plate. An inner edge of the gasket portion defines an area including a reference point coinciding with a center point of a biggest imaginary circle fittable within the area. The area has a form defined by
(Continued)

a number of corner points of an imaginary plane geometric figure of which at least one is displaced from an arc of the circle, and the same number of thoroughly curved lines connecting the corner points, wherein a first corner point is a first distance from the reference point, a second one is closest to the first corner point in a clockwise direction and on a second distance from the reference point, and a third one is closest to the first corner point in a counter clockwise direction and on a third distance from the reference point.

12 Claims, 3 Drawing Sheets

(51) Int. Cl.
| | |
|---|---|
| *F16J 15/10* | (2006.01) |
| *F28D 9/00* | (2006.01) |
| *F28F 3/00* | (2006.01) |
| *F28F 3/02* | (2006.01) |
| *F28F 3/10* | (2006.01) |
| *F28F 3/08* | (2006.01) |
| *F28F 19/01* | (2006.01) |
| *F28F 1/02* | (2006.01) |
| *F28F 9/02* | (2006.01) |

(52) U.S. Cl.
CPC ............... *F28D 9/00* (2013.01); *F28F 3/083* (2013.01); *F28F 19/01* (2013.01); *F28F 1/02* (2013.01); *F28F 2009/0285* (2013.01)

(56) References Cited

U.S. PATENT DOCUMENTS

| | | | | |
|---|---|---|---|---|
| 4,182,411 A * | 1/1980 | Sumitomo | ............... | F28B 1/02 |
| | | | | 165/110 |
| 4,195,853 A | 4/1980 | Otsuka | | |
| 5,727,623 A | 3/1998 | Yoshioka et al. | | |
| 5,740,859 A | 4/1998 | Finch | | |
| 5,832,736 A * | 11/1998 | Yoshioka | ............... | F25B 39/022 |
| | | | | 165/167 |
| 6,318,456 B1 | 11/2001 | Brenner | ............... | F28D 9/0018 |
| | | | | 165/133 |
| 7,404,434 B2 * | 7/2008 | Martin | ................ | F28F 9/026 |
| | | | | 165/167 |
| 9,217,608 B2 * | 12/2015 | Krantz | ................ | F28F 3/10 |
| 2006/0032621 A1 * | 2/2006 | Martin | ................ | F28F 9/026 |
| | | | | 165/167 |
| 2007/0089283 A1 * | 4/2007 | Wilson | ................ | F16J 15/061 |
| | | | | 29/428 |
| 2008/0210414 A1 | 9/2008 | Blomgren et al. | | |
| 2008/0223564 A1 * | 9/2008 | Bjornsson | ................ | F28D 9/005 |
| | | | | 165/167 |
| 2009/0159251 A1 | 6/2009 | Blomgren | | |
| 2010/0181055 A1 | 7/2010 | Yamada | | |
| 2010/0187771 A1 * | 7/2010 | Waltenberg | ......... | F01N 13/1827 |
| | | | | 277/595 |
| 2011/0139419 A1 | 6/2011 | Blomgren et al. | | |
| 2012/0012291 A1 * | 1/2012 | Ito | ............ | F28F 9/026 |
| | | | | 165/166 |
| 2013/0126137 A1 * | 5/2013 | Velte | ....................... | F28D 9/005 |
| | | | | 165/167 |
| 2015/0247682 A1 * | 9/2015 | Nilsson | ................... | F28F 3/046 |
| | | | | 165/185 |
| 2015/0276319 A1 * | 10/2015 | Hedberg | ................ | F28F 3/046 |
| | | | | 165/166 |
| 2015/0330720 A1 * | 11/2015 | Hedberg | ................ | F28F 3/083 |
| | | | | 165/76 |

FOREIGN PATENT DOCUMENTS

| | | |
|---|---|---|
| CN | 203595447 U | 5/2014 |
| DE | 24 59 560 A1 | 6/1976 |
| EP | 1722184 A2 | 11/2006 |
| GB | 2 312 042 A | 10/1997 |
| JP | 09-072685 A | 3/1997 |
| JP | 9-502512 | 3/1997 |
| JP | 09-217993 A | 8/1997 |
| WO | WO 95/07422 A1 | 3/1995 |
| WO | 01/67021 A1 | 9/2001 |
| WO | 2008/128778 A1 | 10/2008 |
| WO | WO 2009/056807 A1 | 5/2009 |

OTHER PUBLICATIONS

Office Action dated Feb. 22, 2016, by the Canadian Intellectual Property Office in corresponding Canadian Patent Application No. 2,885,552 (5 pgs).

International Search Report (PCT/ISA/210) dated Sep. 2, 2013, by the European Patent Office as the International Searching Authority for International Application No. PCT/EP2013/060875.

Written Opinion (PCT/ISA/237) dated Sep. 2, 2013 by the European Patent Office as the International Searching Authority for International Application No. PCT/EP2013/060875.

Japanese Official Action dated May 30, 2016, by the Japan Patent Office, in corresponding Japanese Patent Application No. 2015-538334 (4 pages).

English language translation of Decision on Grant dated Jan. 24, 2017 by the Russian Federal Service for Intellectual Property in counterpart Russian Patent Application No. 2015120566 (3 pgs).

\* cited by examiner

GASKET AND ASSEMBLY

TECHNICAL FIELD

The invention relates to a gasket according to the preamble of claim 1. The invention also relates to an assembly comprising a heat exchanger plate and such a gasket.

BACKGROUND ART

Plate heat exchangers typically consist of two end plates in between which a number of heat transfer plates are arranged in an aligned manner. In one type of well-known PHEs, the so called gasketed plate heat exchangers, gaskets are arranged between the heat transfer plates, more particularly along edges and around port holes of the heat transfer plates. The end plates, and therefore the heat transfer plates, are pressed towards each other whereby the gaskets seal between the heat transfer plates. The gaskets define parallel flow channels between the heat transfer plates through which channels two fluids of initially different temperatures alternately can flow for transferring heat from one fluid to the other. For optimized performance of a gasketed PHE, the design of the gaskets should be adapted to the design of the other components of the PHE, such as the design of the heat transfer plates.

The fluids enter and exit the channels through inlet and outlet ports, respectively, which extend through the plate heat exchanger and are formed by the respective aligned port holes in the heat transfer plates. The inlet and outlet ports communicate with inlets and outlets, respectively, of the plate heat exchanger. Equipment like pumps is required for feeding the two fluids through the plate heat exchanger. The smaller the inlet and outlet ports are, the larger the pressure drop of the fluids inside the PHE gets and the more powerful, and thus expensive, equipment is required for proper operation of the PHE. Naturally, the diameter of the inlet and outlet ports could be made larger in order to decrease the pressure drop of the fluids and enable use of less powerful equipment. However, enlarging the diameter of the inlet and outlet ports means increasing the diameter of the of the port holes in the heat transfer plates. In turn, this could result in that valuable heat transfer surface of the heat transfer plate must be sacrificed which is typically associated with a lowered heat transfer efficiency of the plate heat exchanger.

SUMMARY

An object of the present invention is to provide a gasket for a heat exchanger plate that is associated with a relatively low pressure drop and therefore can be used in connection with also relatively less powerful peripheral equipment. As mentioned above, for optimized performance of a PHE with gaskets, the design of the gaskets should be adapted to the design of the rest of the PHE. As an example, typically, the gaskets should be so designed that they at least partly follow, and run close to, the edges of the heat exchanger plates to maximize the heat transfer surface of the PHE. At the same time, the distance between gasket and edge must be large enough so as to enable that the gasket can be sufficiently supported at the edge. The basic concept of the invention is to provide a gasket adapted to a heat exchanger plate with at least one non-circular port hole instead of a conventional circular one. The port hole and thus the gasket can be adapted to the design of the very heat exchanger plate and the port hole area can be enlarged by sacrificing surface of the heat exchanger plate that does not contribute considerably to the heat transfer performance of the heat exchanger plate. Another object of the present invention is to provide an assembly comprising a heat exchanger plate and such a gasket. The gasket and the assembly for achieving the objects above are defined in the appended claims and discussed below.

A gasket for arrangement on a heat exchanger plate according to the present invention has an annular gasket portion arranged to enclose a port hole of the heat exchanger plate. An inner edge of the annular gasket portion defines an area including a reference point coinciding with a center point of a biggest imaginary circle that can be fitted within the area. The gasket is characterized in that the area defined by the inner edge of the annular gasket portion has a form defined by a number of corner points of an imaginary plane geometric figure, of which at least one corner point is displaced from an arc of the circle, and the same number of thoroughly curved lines connecting these corner points. A first corner point of the corner points is arranged on a first distance from the reference point. A second one of the corner points is arranged closest to the first corner point in a clockwise direction and on a second distance from the reference point. Further, a third one of the corner points is arranged closest to the first corner point in a counter clockwise direction and on a third distance from the reference point.

The term "heat exchanger plate" as used herein is meant to include both the end plates and the heat transfer plates of the plate heat exchanger even if focus herein will be on the heat transfer plates.

The annular gasket portion is arranged to run along an edge of the port-hole. A distance between the gasket portion and the port-hole edge is essentially the same along the gasket portion. Thus, the area defined by the gasket portion is essentially uniform to, but of course larger than, the port-hole. Accordingly, the advantage of the gasket, or more particularly the gasket portion, being designed with a certain form is that it is adapted to a port-hole with essentially the same form, which form, in turn, may be beneficial in different ways. In view thereof, below, when discussing different possible features of the gasket, reference is made to the advantages of the port-hole to which the gasket having these features is adapted.

The plane geometric figure can be of many different types, for example a triangle, a quadrangle, a pentagon and so on. Thus, the number of corner points or extreme points, and thus curved lines, may differ from being two and up.

By thoroughly curved lines is meant lines that have no straight parts. Thus, the inner edge of the annular gasket portion will have a contour without any straight portions and thus be adapted to a port hole with a contour without any straight portions. This is beneficial since it will result in relatively low bending stresses around the port hole. A fluid flowing though the port hole strives to bend the port hole into a circular form. Thus, if the port hole had straight portions, that would result in relatively high bending stresses in the heat exchanger plate.

Each of the curved lines connects two of the corner points.

Since at least one of the corner points is displaced from the arc of the imaginary circle, the area defined by the annular gasket portion will be non-circular.

When talking about the orientation of the corner points, clockwise and counter clockwise direction refers to direction when the gasket is arranged properly on the heat exchanger plate and viewed in a normal direction of the heat exchanger plate.

The feature that the second and third corner points are closest to the first corner point in a clockwise and a counter clockwise direction, respectively, expresses the relative positioning of the first, second and third corner points following the inner edge of the annular gasket portion.

Talking about the first, the second and the third distance between the reference point and the first, the second and the third corner points, respectively, it is the shortest distance that is in view.

According to one embodiment of the inventive gasket, the number of corner points and curved lines is equal to three. In connection therewith, the corresponding plane geometric figure could be a triangle. This embodiment is suitable for many conventional heat exchanger plates with an essentially rectangular shape and the port holes arranged at the corners of heat exchanger plate.

The curved lines may be concave or outwards bulging as seen from the reference point of the area defined by the annular gasket portion. Such a design enables a relatively large area defined by the annular gasket portion, which area is thus adapted for a relatively large port hole area, which in turn is associated with a relatively low pressure drop.

The gasket may be such that the first, second and third corner points are arranged on first, second and third imaginary straight lines, respectively, which extend from the reference point of the area. A first angle between the first and second imaginary straight lines may be essentially equal to a third angle between the third and first imaginary straight lines. Further, the gasket may be such that the second distance between the second corner point and the reference point is equal to the third distance between the third corner point and the reference point. These designs enable adaptation of the gasket to a symmetric port hole, and thus a symmetric annular gasket portion where the symmetry axis is parallel to the first imaginary straight line. A symmetric port hole may facilitate manufacturing of the heat exchanger plate.

In accordance with the invention, the first distance between the first corner point and the reference point may be smaller than the second distance between the second corner point and the reference point and/or the third distance between the third corner point and the reference point. Thereby, the gasket may be adapted to a shape of the port hole in turn adapted to the design of the rest of the heat exchanger plate. More particularly, depending on the heat exchanger plate design, there may be more room for extension of the port hole in a direction of the second and third corner points than in a direction of the first corner point.

The annular gasket portion of the gasket may be such that a first curved line of the curved lines, which connects the first and second corner points, and a third curved line of the curved lines, which connects the third and first corner points, are similar but mirror inverted in relation to each other. Such uniform curved lines enable a symmetric gasket adapted to a symmetric port hole where the symmetry axis is parallel to the first imaginary straight line. As mentioned above, a symmetric port hole may facilitate manufacturing of the heat exchanger plate.

The assembly according to the present invention comprises a heat exchanger plate and a gasket as described above.

Still other objectives, features, aspects and advantages of the invention will appear from the following detailed description as well as from the drawings.

BRIEF DESCRIPTION OF THE DRAWINGS

The invention will now be described in more detail with reference to the appended schematic drawings, in which.

DETAILED DESCRIPTION

Figure 1:
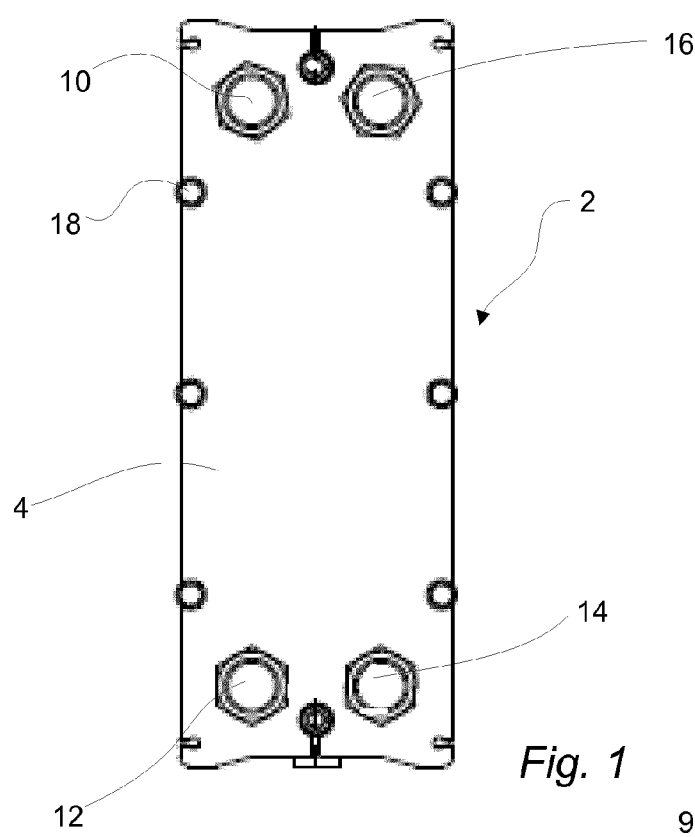
FIG. 1 is a front view of a plate heat exchanger.
Figure 2:
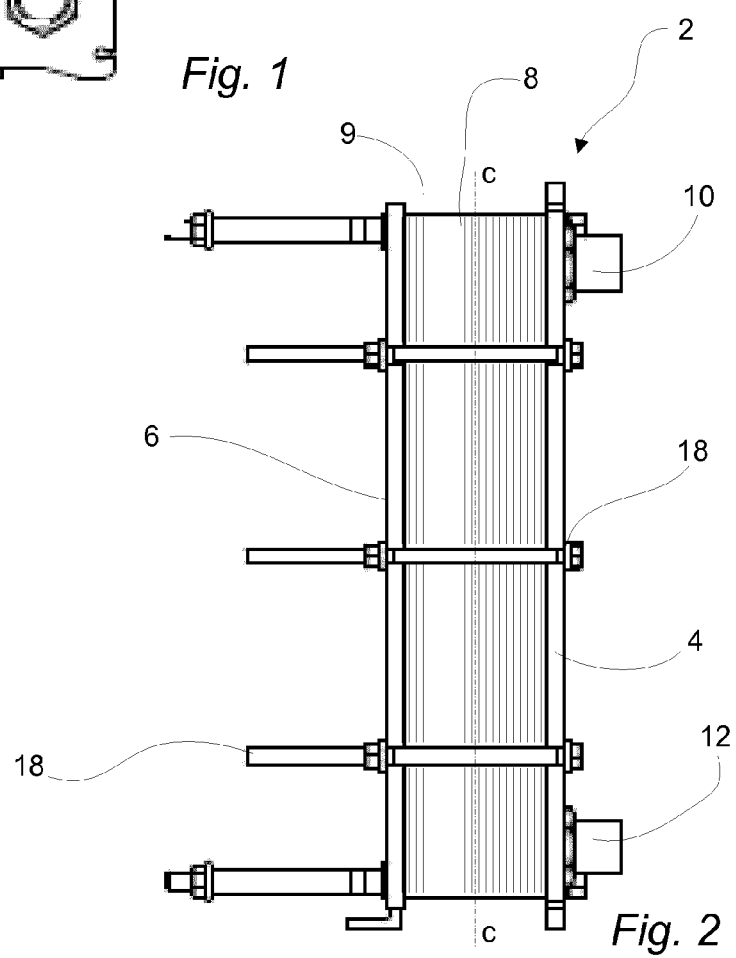
FIG. 2 is a side view of the plate heat exchanger of FIG. 1.

With reference to FIGS. 1 and 2, a gasketed plate heat exchanger 2 is shown. It comprises heat exchanger plates in the form of a first end plate 4, a second end plate 6 and a number of heat transfer plates arranged between the first and second end plates 4 and 6, respectively. The heat transfer plates are of two different types. However, since this is of no relevance to the present invention, the difference between the two heat transfer plate types will not be discussed further herein. One of the heat transfer plates, denoted 8, is illustrated in further detail in FIG. 3. The different types of heat transfer plates are alternately arranged in a plate pack 9 with a front side (illustrated in FIG. 3) of one heat transfer plate facing the back side of a neighboring heat transfer plate. Every second heat transfer plate is rotated 180 degrees, in relation to a reference orientation (illustrated in FIG. 3), around a normal direction of the figure plane of FIG. 3.

Figure 3:
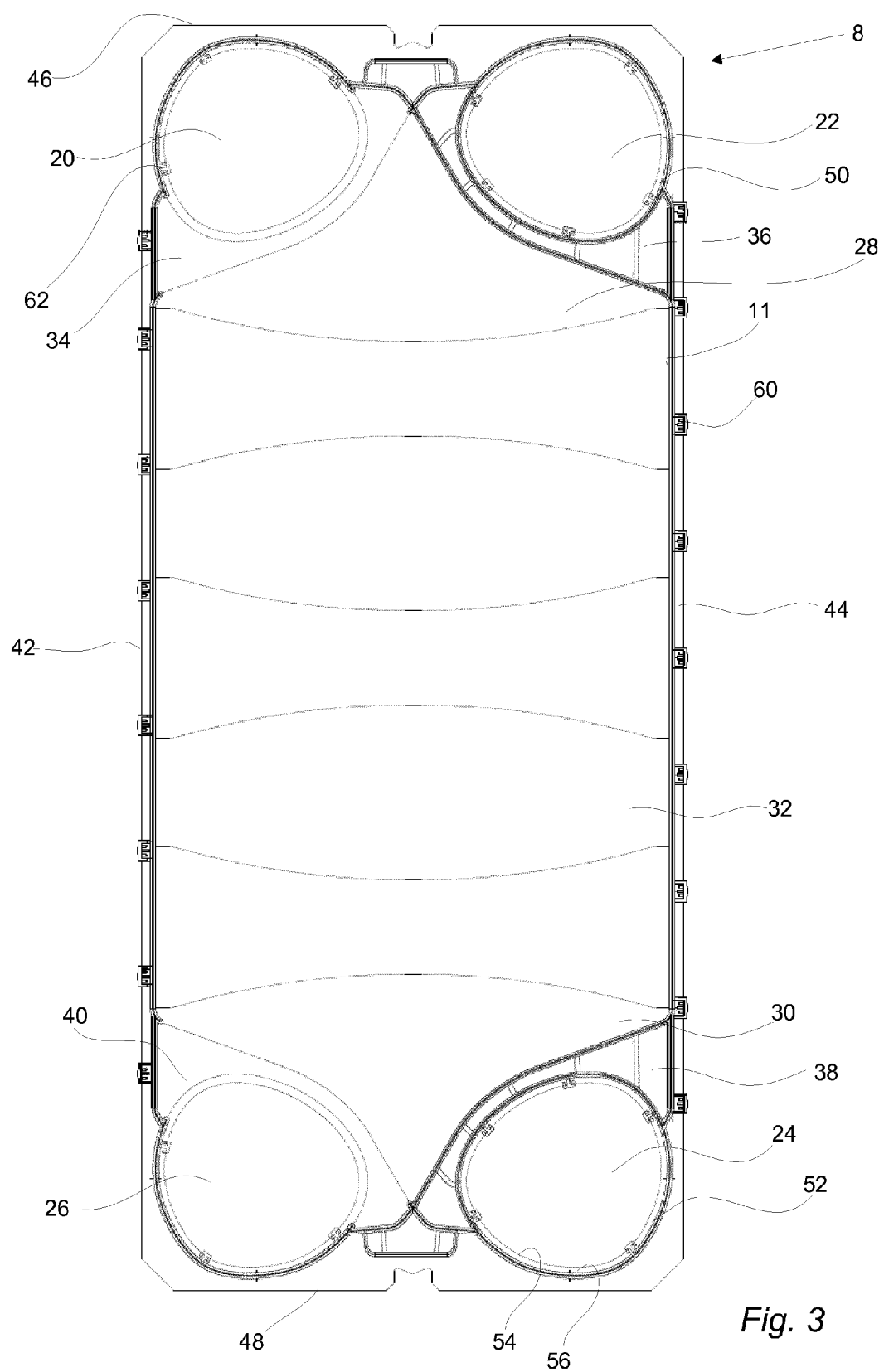
FIG. 3 is a plan view of an assembly according to the invention, i.e. a heat transfer plate provided with a gasket.
Figure 4:
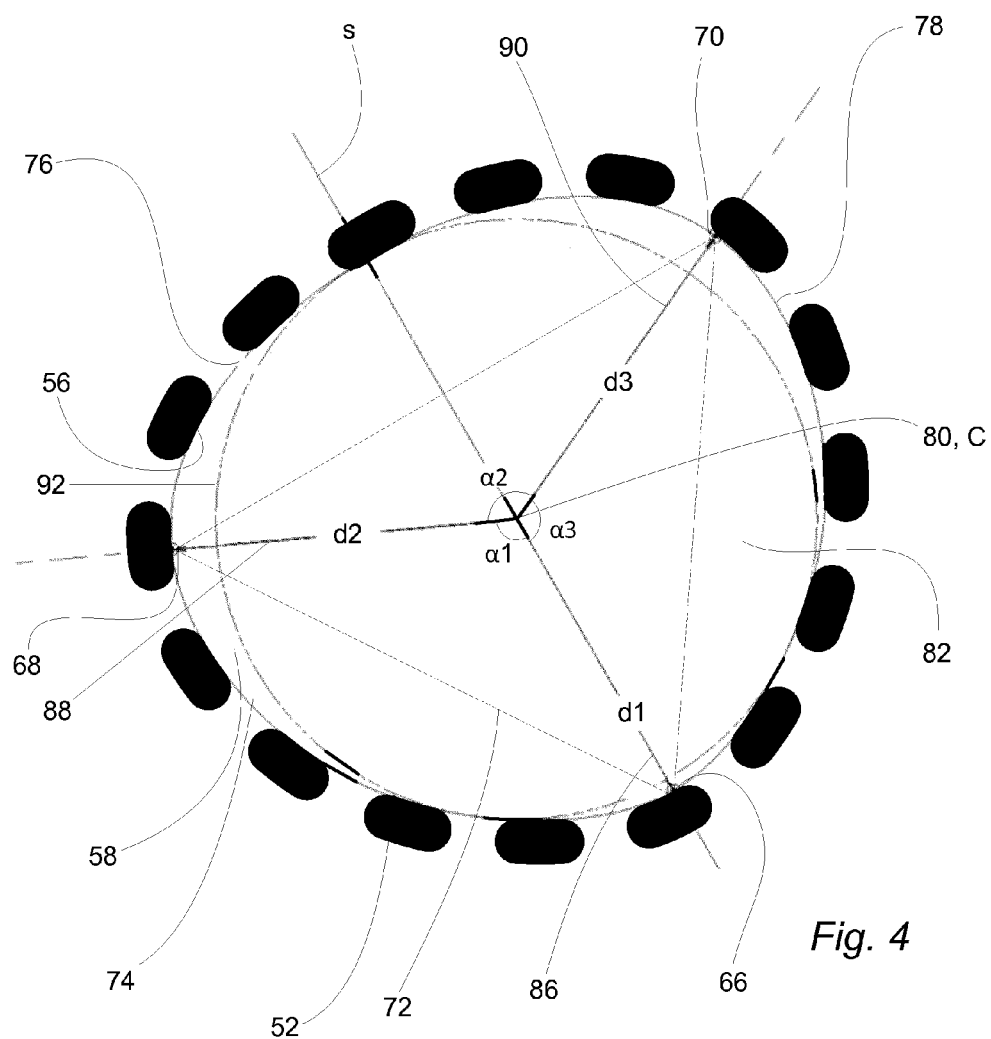
FIG. 4 is a schematic view of a part of the gasket of FIG. 3.
Figure 5:
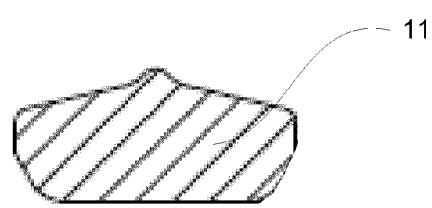
FIG. 5 is illustrates the gasket of FIG. 3 in cross section.

The heat transfer plates are separated from each other by gaskets, of which one, denoted 11, is illustrated in further detail in FIGS. 3 and 4. Also, in FIG. 5 a cross-section of the gasket 11 is illustrated. The heat transfer plates together with the gaskets form parallel channels arranged to receive two fluids for transferring heat from one fluid to the other. To this end, a first fluid is arranged to flow in every second channel and a second fluid is arranged to flow in the remaining channels. The first fluid enters and exits the plate heat exchanger 2 through inlet 10 and outlet 12, respectively. Similarly, the second fluid enters and exits the plate heat exchanger 2 through inlet 14 and outlet 16, respectively. For the channels to be leak proof, the heat transfer plates must be pressed against each other whereby the gaskets seal between the heat transfer plates. To this end, the plate heat exchanger 2 comprises a number of tightening means 18 arranged to press the first and second end plates 4 and 6, respectively, towards each other.

The heat transfer plate 8 is an essentially rectangular sheet of stainless steel. It has a central extension plane c-c (see FIG. 2) parallel to the figure plane of FIG. 3. The heat transfer plate 8 comprises an inlet port hole 20 for the first fluid and an outlet port hole 22 for the second fluid connected to the inlet 10 and the outlet 16, respectively, of the plate heat exchanger 2. Further, the heat transfer plate 8 comprises an inlet port hole 24 for the second fluid and an outlet port hole 26 for the first fluid connected to the inlet 14 and the outlet 12, respectively, of the plate heat exchanger 2. The inlet and outlet port holes will not be described in detail herein. Instead, reference is made to applicant's co-pending patent application EP12190496.5, which is hereby incorporated herein by reference. The heat transfer plate 8 also comprises different areas, i.e. two distributions areas 28, 30, a heat transfer area 32 extending between the distribution areas and adiabatic areas 34, 36, 38 and 40 extending between the inlet and outlet port holes and the distribution areas. Each of the areas is provided with a corrugation pattern (not illustrated) in the form of projections and depressions in relation to the central extension plane c-c, which corrugation has a design depending on a main task of the area. The main task of the distribution areas 28 and 30 is to spread a fluid across the entire width of the heat transfer plate 8. The main task of the heat transfer area 32 is to transfer heat from a fluid on one side of the heat transfer plate 8 to a fluid on the other side of the heat transfer plate. The main task of the adiabatic areas 34, 36, 38 and 40 is to guide a fluid between the inlet and outlet port holes 20, 22, 24 and 26 and the distribution areas 28 and 30, i.e. they are simply areas for fluid transport. The different areas and corrugation patterns will not be described in detail herein. Instead, reference is made to applicant's co-pending patent application EP12190493.2.

The heat transfer plate 8 is provided with a gasket groove arranged to receive the gasket 11, which is made of rubber. Arranged properly in the gasket groove, the gasket 11 runs along long sides 42 and 44 and short sides 46 and 48 of the heat transfer plate 8, and also diagonally across the heat transfer plate as is typical for most heat transfer plates and gaskets. Specifically, the gasket 11 comprises two annular gasket portions 50 and 52 encircling the outlet port hole 22 and the inlet port hole 24, respectively. The annular gasket portions 50 and 52 are similar why only one of them, the one denoted 52, will be described hereinafter.

The annular gasket portion 52 runs along a hole edge 54 of the port hole 24. A distance between an inner edge 56 of the annular gasket portion 52 and the hole edge 54 of the port hole 24 is the same along the annular gasket portion 52. In other words, the design of the annular gasket portion 52 is adapted to the form of the port hole 24. Thus, the inner edge 56 of the annular gasket portion 52 delimits an area 58 (FIG. 4) which is uniform with, but larger than, the port hole 24.

The annular gasket portion 52 is schematically, with broken lines for clarity, and separately illustrated in FIG. 4. The area 58 defined by it has an outer contour defined by first, second and third corner points 66, 68 and 70, respectively, of an imaginary triangle 72 (dashed lines). Further, these corner points are connected by first, second and third thoroughly curved lines 74, 76 and 78, respectively, which are concave as seen from within the inlet port hole. A reference point 80 of the area 58 coincides with a center point C of a biggest imaginary circle 82 (ghost lines) that can be arranged within the area. The first corner point 66 is arranged on a first imaginary straight line 86 extending from the reference point 80 and on a first distance d1 from the reference point. The second corner point 68 is positioned closest to the first corner point in the clockwise direction. Further, it is arranged on a second imaginary straight line 88 extending from the reference point 80 and on a second distance d2 from the reference point. The third corner point 70 is positioned closest to the first corner point in the counter clockwise direction. Further, it is arranged on a third imaginary straight line 90 extending from the reference point 80 and on a third distance d3 from the reference point.

For the above first, second and third distances the following relationships are valid: d2=d3 and d2>d1. Further, a first angle $\alpha 1$ between the first and second imaginary straight lines is smaller than a second angle $\alpha 2$ between the second and third imaginary straight lines and essentially equal to a third angle $\alpha 3$ between the second and first imaginary straight lines. In other words, for the first, second and third angles the following relationships are valid: $\alpha 1=\alpha 3$ and $\alpha 1<\alpha 2$. In this specific example, $\alpha 1=\alpha 3=115$ degrees. Moreover, the first curved line 74 connecting the first and second corner points 66 and 68 is essentially uniform to the third curved line 78 connecting the third and first corner points 70 and 66. In all, this means that the area 58 is symmetric with a symmetry axis s extending through the first corner point 66 and the reference point 80.

As apparent from the figures and the description above, since the inlet port hole 24 does not have a conventional circular form, neither has the annular gasket portion 52. Instead, they have a form defined by a number of corner points, here three, of which at least one, here all, are displaced from an arc 92 of the circle 82, and the same number of curved lines (here thus three) connecting these corner points. If the inlet port hole 24 was circular, the annular gasket portion 52 would preferably have an inner edge 56 coinciding with the arc 92 of the circle 82. From a pressure drop point of view, with reference to the previous discussions in this regard, a very large inlet port hole would be preferable. However, the design of the rest of the heat transfer plate 8, limits the possible size of the inlet port hole. For example, a larger circular inlet port hole would mean that a contour of the inlet port hole would be arranged closer to the short side 48 and/or the long side 44 which could result in strength problems of the heat transfer plate 8. Further, a larger circular inlet port hole could also mean that the area between the inlet port hole 24 and the distribution area 30 (FIG. 3) could be too narrow for the gasket arrangement. Such a narrow intermediate area could also cause problems in pressing the heat transfer plate with the above referenced corrugation patterns. Naturally, the distribution area 30 of the heat transfer plate 8 could be displaced further down on the heat transfer plate to make room for a larger circular inlet port hole 24. However, this would typically be associated with a smaller heat transfer area 32 and thus a worsened heat transfer capability of the heat transfer plate.

As described above and illustrated in the figures, the area of the inlet port hole can be increased without having to amend the design of the rest of the heat transfer plate. By letting the inlet port hole occupy more of the adiabatic area 38 of the heat transfer plate 8 than a circular inlet port hole with a circular form would do, a larger inlet port hole associated with a smaller pressure drop can be realized. Since it is the adiabatic area only that is affected by this the enlargement, the distribution and heat transfer capability of the heat transfer plate 8 remains essentially unaffected. Further, since the contour of the inlet port hole 24 lacks straight portions, the bending stresses around the inlet port hole will be relatively low.

Another advantage with the above described non-circular inlet port hole concerns gasket attachment and filters. The gasket 11 comprise grip means 60 and 62 arranged for engagement with an edge of the heat transfer plates 8 for securing the gaskets to the heat transfer plates. In connection with some plate heat exchanger applications, for example in applications associated with treatment of fluids contaminated in some way, filter inserts are used to prevent that contaminations come into the channels between the heat transfer plates. These filter inserts typically have the shape of a circular cylinder and they extend through the inlet and/or outlet ports of the plate heat exchanger, i.e. through the inlet and outlet port holes of the heat transfer plates. If, as is conventional, the inlet and outlet port holes of the heat transfer plates are circular, then the grip means of the gaskets may interfere with the filter inserts. However, if the annular gasket portion and the inlet and outlet port holes instead have a form as described above, the gaskets can be adapted such that the gasket grip means engage with the heat transfer plate at the corner points of the inlet and outlet port holes. Thereby, there is no risk of interference between the gaskets and the circular cylindrical filter inserts.

The grip means 60 and 62 are of different types and not described in detail herein. Instead, for a detailed description of the grip means 60, reference is made to applicant's copending patent application EP 13153167.5, which is hereby incorporated herein by reference.

The above described embodiment of the present invention should only be seen as an example. A person skilled in the art realizes that the embodiment discussed can be varied in a number of ways without deviating from the inventive conception.

The end plates 4 and 6 of the above described plate heat exchanger 2 are conventionally designed with circular inlets and outlets. However, also the end plates could be provided with non-circular inlets and outlets similar to the above described inlet and outlet port holes.

Further, above, the form of the area defined by the annular gasket portion is defined by an imaginary plane geometric figure in the form of a triangle, three corner points and three curved lines. Naturally, other imaginary plane geometric figures, and also another number of corner points and curved lines, could be used to define the area in alternative embodiments.

The above described inlet port hole, and thus the annular gasket portion, is symmetric with a symmetry axis s. Of course, the inlet port hole, and thus the annular gasket portion, could instead be completely asymmetric or even more symmetric with more than one symmetry axis. As an example, the curved lines could all be uniform/non-uniform and/or the distance to the reference point for all corner points could be the same/different. Also, the curved lines need not be concave. One or more of the curved lines may have other forms.

The above described plate heat exchanger is of parallel counter flow type, i.e. the inlet and the outlet for each fluid are arranged on the same half of the plate heat exchanger and the fluids flow in opposite directions through the channels between the heat transfer plates. Naturally, the plate heat exchanger could instead be of diagonal flow type and/or a co-flow type.

Two different types of heat transfer plates, and one type of gasket between the heat transfer plates, are comprised in the plate heat exchanger above. Naturally, the plate heat exchanger could alternatively comprise only one plate type or more than two different plate types. Further, the heat transfer plates could be made of other materials than stainless steel. Further, the plate heat exchanger could comprise more than one type of gasket between the heat transfer plates, and the gaskets could be made of other materials than rubber. Also, the gasket could comprise the annular gasket portion only, i.e. it could be designed as a so-called ring gasket.

Also, other means than grip means could be used for attaching the gasket to the heat transfer plate, e.g. glue or adhesive tape or some other type of mechanical attachment means.

Finally, the present invention could be used in connection with other types of plate heat exchangers than gasketed ones, such as plate heat exchangers comprising partly/only permanently joined heat transfer plates.

It should be stressed that the attributes first, second, third, etc. is used herein just to distinguish between species of the same kind and not to express any kind of mutual order between the species.

It should be stressed that a description of details not relevant to the present invention has been omitted and that the figures are just schematic and not drawn according to scale. It should also be said that some of the figures have been more simplified than others. Therefore, some components may be illustrated in one figure but left out on another figure.

The invention claimed is:

1. A plate heat exchanger comprising:
   a plurality of heat transfer plates arranged in a plate pack and separated from one another by gaskets, the heat transfer plates together with the gaskets defining fluid channels to alternatively receive two fluids to transfer heat from one of the fluids to the other fluid;
   the plurality of heat transfer plates comprising first and second heat transfer plates positioned adjacent one another with at least one of the gaskets located between the first and second heat transfer plates;
   the first and second heat transfer plates including a plurality of port holes, the plurality of port holes in the first and second heat transfer plates comprising an inlet port hole for one of the fluids, an outlet port hole for the one fluid, an inlet port hole for the other fluid and an outlet port hole for the other fluid,
   the one gasket comprising:
      an annular gasket portion enclosing a respective one of the port holes of the first and second heat exchanger plates, an inner edge of the annular gasket portion defining an area including a reference point coinciding with a center point of a biggest reference circle that can be fitted within the area, the area having a form defined by:
         a number of corner points of a reference plane geometric figure, fit within the area, of which at least one of the corner points is displaced from an arc of the reference circle; and the number of corner points comprising a first corner point, a second corner point and a third corner point; and
         a number of thoroughly curved lines, each respectively connecting two of the corner points, the number of thoroughly curved lines connecting the corner points being equal to the number of corner points;
      the first corner point is arranged at a first distance from the reference point, the second corner point is arranged closest to the first corner point in a clockwise direction and at a second distance from the reference point and the third corner point is arranged closest to the first corner point in a counter clockwise direction and at a third distance from the reference point;
      the area having one symmetry axis only, which extends through both the first corner point and the reference point; and
      the form of the area generally corresponds to an overall shape of the respective one of the port holes that the annular gasket portion encloses.

2. The plate heat exchanger according to claim 1, wherein the number of corner points and curved lines is equal to three.

3. The plate heat exchanger according to claim 1, wherein the curved lines are concave seen from the reference point of the area.

4. The plate heat exchanger according to claim 1, wherein the first distance between the first corner point and the reference point is smaller than the second distance between the second corner point and the reference point.

5. The plate heat exchanger according to claim 1, wherein the first distance between the first corner point and the reference point is smaller than the third distance between the third corner point and the reference point.

6. A plate heat exchanger comprising:

a plurality of heat transfer plates arranged in a plate pack and separated from one another by gaskets, the heat transfer plates together with the gaskets defining fluid channels to alternatively receive two fluids to transfer heat from one of the fluids to the other fluid;

the plurality of heat transfer plates comprising first and second heat transfer plates positioned adjacent one another with at least one of the gaskets located between the first and second heat transfer plates;

the first and second heat transfer plates each possessing a pair of oppositely disposed relatively longer sides respectively extending between opposite ends of each of the first and second heat transfer plate and a pair of oppositely disposed relatively shorter sides respectively positioned at the opposite ends of each of the first and second heat transfer plates;

the first and second heat transfer plates each respectively including two port holes at one of the respective opposite ends of each of the first and second heat transfer plates and two port holes at the other one of the respective opposite ends of each of the first and second heat transfer plates, the two port holes at the one of the opposite ends of each of the first and second heat transfer plates and the two port holes at the opposite end of each plate comprising: an inlet port hole for one of the fluids, an outlet port hole for the one fluid, an inlet port hole for the other fluid and an outlet port hole for the other fluid;

the one gasket comprising:

an annular gasket portion enclosing a respective one of the port holes of the first and second heat exchanger plates, an inner edge of the annular gasket portion defining an area including a reference point coinciding with a center point of a biggest reference circle that can be fitted within the area, the area having a form defined by:

a total of three corner points of a reference plane geometric figure, fit within the area, the three corner points comprising a first corner point, a second corner point and a third corner point;

the first, second and third corner points being located radially outwardly from the reference circle, the second corner point being arranged closest to the first corner point in a clockwise direction, the third corner point being arranged closest to the first corner point in a counter clockwise direction;

a number of thoroughly curved lines each respectively connecting adjacent ones of the three corner points, the number of thoroughly curved lines connecting adjacent corner points being equal to the number of corner points;

the first corner point being arranged at a first distance from the reference point along a first imaginary straight line extending from the reference point to the first corner point, the second corner point being arranged at a second distance from the reference point along a second imaginary straight line extending from the reference point to the second corner point, and the third corner point being arranged at a third distance from the reference point along a third imaginary straight line extending from the reference point to the third corner point;

two of the first, second and third distances being equal to each other, and two of the first, second and third distances being unequal to each other;

a first angle formed between the first and second imaginary straight lines, a second angle formed between the second and third imaginary straight lines, and a third angle formed between the third and first imaginary straight lines;

two of the first, second and third angles being equal to each other, and two others of the first, second and third angles being unequal to each; and the form of the area generally corresponds to an overall shape of the respective one of the port holes that the annular gasket portion encloses.

7. The plate heat exchanger according to claim 6, wherein the second and third distances are equal to each other, and the first and third angles are equal to each other.

8. The plate heat exchanger according to claim 6, wherein the second and first distances are unequal to each other, and the first and second angles are unequal to each other.

9. The plate heat exchanger according to claim 8, wherein the second angle is greater than the first and third angles.

10. The plate heat exchanger according to claim 6, wherein the curved lines are bulging outward as seen from the reference point of the area.

11. The plate heat exchanger according to claim 6, wherein the first distance is smaller than the second distance.

12. The plate heat exchanger according to claim 6, wherein the first distance is smaller than the third distance.

* * * * *